United States Patent
Balme

[11] 3,875,115
[45] Apr. 1, 1975

[54] LINEAR POLYIMIDES PREPARED FROM BIS-IMIDES, TERTIARY PHOSPHINES AND DIALDEHYDES

[75] Inventor: Maurice Balme, Sainte-Foy-les-Lyon, France

[73] Assignee: Rhone-Poulence S.A., Paris, France

[22] Filed: Nov. 6, 1973

[21] Appl. No.: 413,245

[30] Foreign Application Priority Data
Nov. 9, 1972 France .............................. 72.39730

[52] U.S. Cl. ...... 260/47 UA, 117/132 B, 117/161 N, 117/161 P, 260/33.4 P, 260/47 CZ, 260/49, 260/51, 260/54, 260/63 N, 260/64, 260/67.5, 260/78 UA
[51] Int. Cl. ............................................. C08g 20/32
[58] Field of Search .......... 260/47 CZ, 67.5, 78 UA, 260/47 UA, 326 R, 49, 63 N, 64, 51, 54

[56] References Cited
UNITED STATES PATENTS
3,737,412  6/1973  Wildi .................. 260/67.5

*Primary Examiner*—Lester L. Lee
*Attorney, Agent, or Firm*—Stevens, Davis, Miller & Mosher

[57] ABSTRACT

The invention provides a linear polyimide which corresponds essentially to the general formula:

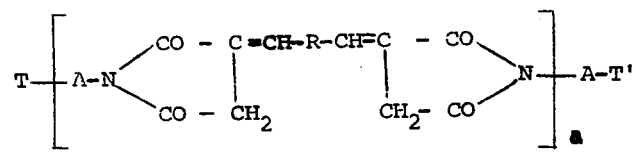

in which:
A represents a divalent organic radical with 2 to 30 carbon atoms,
R represents a simple valency bond or a divalent organic radical with 1 to 24 carbon atoms,
$a$ represents a number at least equal to 1 and
T and T', which may be identical or different, each represents either a radical of the formula:

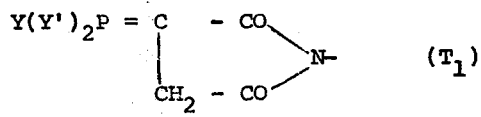

in which Y represents a hydrocarbon radical with 4 to 12 carbon atoms, and each of the symbols Y', which may be identical or different, represents a hydrocarbon radical with 1 to 12 carbon atoms or Y and Y' together form a divalent hydrocarbon radical with 2 to 12 carbon atoms; or a maleimido radical of the formula:

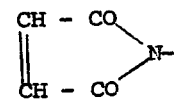

or an isomaleimido radical of the formula:

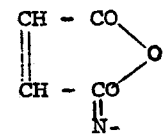

or a radical of the formula:

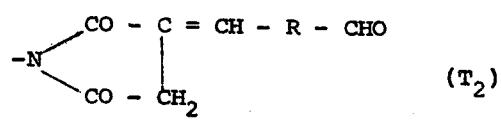

in which R is defined above. These polyimides are useful as, for example, films, filaments, laminates and moulded articles.

12 Claims, No Drawings

LINEAR POLYIMIDES PREPARED FROM BIS-IMIDES, TERTIARY PHOSPHINES AND DIALDEHYDES

The present invention relates to linear polyimides.

Linear polymers which are blocked by maleimido groups and which have the recurring unit of the formula:

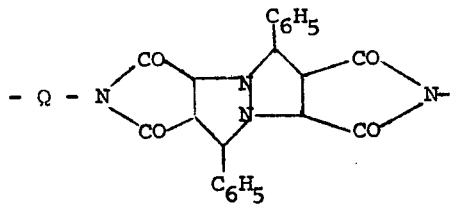

in which Q represents a phenylene or hexamethylene radical have already been described [See Stille & Anyos J. Polym. Sci. A, vol. 2, page 1487 (1964)]. These polymers were obtained by heating the bis-maleimide corresponding to the radical Q with benzalazine. The authors state that the viscosity of the polymers decreases after prolonged heating above 200°C and they conclude that this is a consequence of depolymerisation.

It is also known [see, for example, E. HEDAYA & S. THEODOROPOULOS Tetrahedron, 24, 2241–54 (1967)] that the reaction of triphenylphosphine with certain maleimides and isomaleimides leads to phosphoranylidene-succinimides; benzylidene-succinimides have also been obtained from phosphoranylidene-succinimides and benzaldehyde.

The present invention provides new linear polyimides which correspond essentially to the general formula:

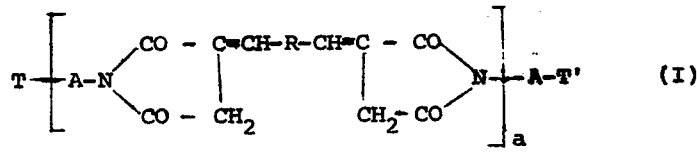 (I)

in which:

A represents a divalent organic radical with 2 to 30 carbon atoms,

R represents a simple valency bond or a divalent organic radical with 1 to 24 carbon atoms, a represents a number at least equal to 1 and T and T', which may be identical or different, each represents a radical of the formula

 $(T_1)$ in which the symbol Y represents a hydrocarbon radical with 4 to 12 carbon atoms, and each of the symbols Y', which may be identical or different, represents a hydrocarbon radical with 1 to 12 carbon atoms, or, taken together, form a divalent hydrocarbon radical with 2 to 12 carbon atoms, or a maleimido radical of formula:

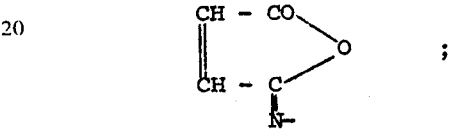

or an isomaleimido radical of formula:

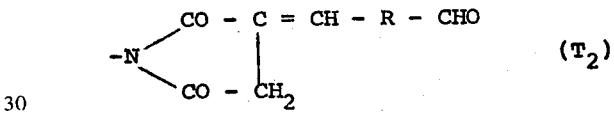

or a radical of the formula:

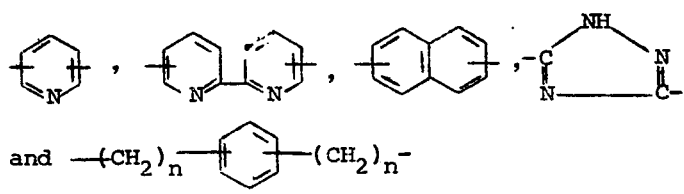 $(T_2)$ in which R has the meaning given above.

In formula (I), the symbol A can, for example, denote an alkylene radical having less than 13 carbon atoms, a phenylene radical, a cyclohexylene radical, one of the radicals of the formulae:

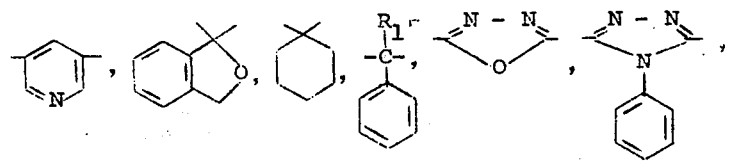

wherein n represents an integer from 1 to 3, a divalent radical with 12 to 30 carbon atoms, consisting of phenylene or cyclohexylene radicals bonded to one another by a simple valency bond or by an inert atom or group such as —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—,

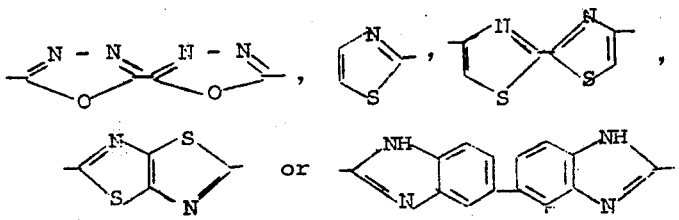

wherein R₁ represents a hydrogen atom, an alkyl radical with 1 to 4 carbon atoms, a phenyl radical or a cyclohexyl radical and X represents an alkylene radical with less than 13 carbon atoms. The various phenylene or cyclohexylene radicals can be substituted by, for example, methyl groups.

The symbols Y and Y' can, for example, represent linear or branched alkyl groups with 1 to 12 carbon atoms, a phenylalkyl group with 7 to 11 carbon atoms, a cycloalkyl or cycloalkenyl group with 5 to 8 carbon atoms, a phenyl group, an alkylphenyl group with 7 to 11 carbon atoms or a naphthyl group. Moreover, the phenyl and naphthyl radicals can optionally be substituted by atoms such as fluorine, chlorine or bromine or by groups such as alkoxy groups with 1 to 4 carbon atoms.

The radicals which the symbol R can represent can be aliphatic, alicyclic, aromatic, carbocyclic or heterocyclic. These radicals can be substituted by atoms such as F, Cl and Br or by groups such as NO₂, CH₃, OCH₃ or phenolic hydroxyl. More particularly these radicals can be alkylene radicals with 1 to 12 carbon atoms, alkenylene radicals with 2 to 12 carbon atoms, alkinylene radicals with 4 to 12 carbon atoms, cycloalkylene and cycloalkenylene radicals with 5 to 12 carbon atoms, a pyridinediyl radical, a phenylene radical, a diphenylene radical, a terphenylene radical, a naphthylene radical or a divalent radical possessing several benzene rings bonded to one another by an inert atom or group such as —O—, —S—, —NH—, —N(CH₃)—, —CH₂—, —C(CH₃)₂—, —SO₂—, —C(O)O—, —CONH—, —N=N— and —N=N(→ O)—.

The polyimides according to the invention can be prepared by bringing a bis-imide of the general formula:

in which the symbol A has the meaning given above and the symbol Z represents a maleimido or isomaleimido radical, into contact with a tertiary phosphine of the general formula:

in which the symbols Y and Y' have the meaning given above and a dialdehyde of the general formula:

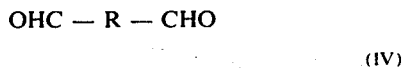

in which the symbol R is defined as above.

Specific examples of bis-maleimides of formula (II) include: N,N'-ethylene-bis-maleimide, N,N'-hexamethylene-bis-maleimide, N,N'-meta-phenylene-bismaleimide, N,N'-para-phenylene-bis-maleimide, N,-N'-4,4'-diphenylylene-bis-maleimide, N,N'-4,4'-diphenylmethane-bis-maleimide, N,N'-4,4'-(diphenyl ether)-bis-maleimide, N,N'-4,4'-diphenylsulphone-bis-maleimide. N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-para-xylylene-bis-maleimide. N,N'-4,4'-(1,1-diphenyl-cyclohexane)-bis-maleimide. N,N'-4,4'-(1,1-diphenyl-propane)-bis-maleimide, N,N'-4,4'-(1,1,1-triphenyl-ethane)-bis-maleimide, N,N'-4,4'-triphenylmethane-bis-maleimide, N,N'-3,5-(1,2,4-triazole)-bis-maleimide and N,N'-4,4'-benzophenone-bis-maleimide.

These bis-imides can be prepared by applying the methods described in, for example, U.S. Pat. No. 3,018,290 and British Patent Specification No. 1,137,592.

Amongst the bis-isoimides of formula (II) which can be used, there may be mentioned: N,N'-ethylene-bis-isomaleimide, N,N'-tetramethylene-bis-isomaleimide, N,N'-decamethylene-bis-isomaleimide, N,N'-metaphenylene-bis-isomaleimide, N,N'-para-phenylene-bisisomaleimide, N,N'-4,4'-diphenylene-bis-isomaleimide, N,N'-4,4'-diphenylmethane-bis-isomaleimide, N,N'-4,4'-(diphenyl ether)-bis-isomaleimide, N,N'-4,4'-diphenylsulphone-bis-isomaleimide, N,N'-4,4'-dicyclohexylmethanebis-isomaleimide, N,N'-α,α'-4,4'-dimethylene-cyclohexanebis-isomaleimide, N,N'-meta-xylylene-bis-isomaleimide, N,N'-para-xylylene-bis-isomaleimide, N,N'-4,4'-(1,1-diphenyl-cyclohexane)-bis-isomaleimide, N,N'-4,4'-(1,1-diphenyl-propane)-bis-isomaleimide, N,N'-4,4'-(1,1,1-triphenyl-ethane)-bis-isomaleimide, N,N'-4,4'-triphenylmethane-bis-isomaleimide, N,N'-3,5-(1,2,4-triazole)-bisisomaleimide and N,N'-4,4'-benzophenone-bis-isomaleimide.

These bis-isoimides can be prepared by applying the method described in, for example U.S. Pat. No. 3,035,065.

Amongst the tertiary phosphines which can be used there may be mentioned: tributyl-phosphine, tri-(t-butyl)-phosphine, propyl-dibutyl-phosphine, trioctyl-phosphine, tridodecyl-phosphine, triphenyl-phosphine, tri-(p-tolyl)-phosphine, tri-(p-butyl-phenyl)-phosphine, tri-(β-naphthyl)-phosphine, tricyclohexyl-phosphine, tris-(p-ethoxyphenyl)-phosphine, tris-(o-chlorophenyl)-phosphine, tris-(p-bromophenyl)-phosphine, tris-(m-fluorophenyl)-phosphine, tribenzyl-phosphine, dimethylphenyl-phosphine, diethylphenyl-phosphine, dihexylphenyl-phosphine, methyldiphenyl-phosphine, vinyldiphenyl-phosphine, diallylphenyl-phosphine and cyclotetramethylenephenyl-phosphine. The preparation of these phosphines is, of course, well known.

Amongst the dialdehydes which correspond to the general formula (IV), there may be mentioned: saturated or unsaturated aliphatic dialdehydes such as glyoxal, malonaldehyde, succinaldehyde, glutaraldehyde, adipaldehyde, pimelaldehyde, suberaldehyde, azelaldehyde, sebacaldehyde, dodecanedial, 1,4-cyclohexanedihexanal, fumaraldehyde, malealdehyde, citraconaldehyde, mesaconaldehyde, 2-pentene-dial, 2-hexene-dial, 3-hexene-dial, butyne-dial and buta-1,3-dien-5-yl-2-heptene-dial and aromatic dialdehydes such as: phthalaldehyde, isophthalaldehyde, terephthalaldehyde, naphthalene-1,2-dicarbaldehyde, naphthalene-1,3-dicarbaldehyde, napthalene-1,4-dicarbaldehyde, naphthalene-1,6-dicarbaldehyde, naphthalene-1,8-dicarbaldehyde, naphthalene-2,6-dicarbaldehyde, naphthalene-1,7-dicarbaldehyde, naphthalene-2,5-dicarbaldehyde, diphenyl-4,4'-dicarbaldehyde, diphenyl-3,3'-dicarbaldehyde, diphenyl-2,3-dicarbaldehyde, diphenyl-2,4-dicarbaldehyde, diphenyl-2,6-dicarbaldehyde, (p-terphenyl)-2,2''-dicarbaldehyde, (o-terphenyl)-2,3-dicarbaldehyde, (m-terphenyl)-2,6'-dicarbaldehyde, (p-terphenyl)-1,4'-dicarbaldehyde, (p-terphenyl)-4,4''-dicarbaldehyde, (p-terphenyl)-3,3''-dicarbaldehyde, (o-terphenyl)-2,6-dicarbaldehyde, 5,-5'-methylene-bis-salicylaldehyde, 4,4'-diformyl-(diphenylether),4,4'-diformyl-diphenylamine, 4,4'-diformyl-(diphenyl thioether), 4,4'-diformyl-diphenylmethane, 4,4'-diformyldiphenylisopropane, 4,4'-diformyl-diphenylsulphone, 4,4'-diformyl-benzophenone, 4,4'-diformyl-azobenzene, phenyl 4,4'-diformyl-benzoate, 4,4'-diformyl-azoxybenzene and 2,6-diformyl-pyridine.

Nitromalonaldehyde and dibromosuccinaldehyde may also be mentioned. When the dialdehydes exist in polymeric form, these can be used advantageously in place of the corresponding monomer.

It is to be understood that it is possible to use a mixture of bis-imides and/or bis-isoimides of the formula (II) and that, likewise, mixtures of the dialdehydes of formula (IV) and of the phosphines of formula (III) can also be used.

The polyimides according to this invention can be prepared by intimately mixing the bis-maleimide and/or bis-isomaleimide, the phosphine and the dialdehyde.

The temperature can vary to a certain extent depending on the nature of the reagents employed but, as a general rule, the reaction can be initiated between 10° and 80°C; this reaction is exothermic and can be continued advantageously by keeping the temperature within this range.

1 to 5 mols of tertiary phosphine per mol of bis-imide are suitably used, and generally from 1 to 2.5 mols. The dialdehyde is suitably employed in an amount of at least 0.5 mol per mol of bis-imide; the upper limit is not critical and can range up to of the order of 10 mols per mol of bis-imide.

The exact proportions of reagents are obviously a function of the molecular weight of the polyimide which it is desired to produce and of the nature of the terminal groups fixed beforehand.

Thus polymers of high molecular weight can be produced when the quantities of reagents used are such that there are approximately 2 mols of tertiary phosphine per mol of bis-imide and, at the same time approximately 0.5 mol of dialdehyde per mol of tertiary phosphine. If, on the other hand, 1 mol of tertiary phosphine and 0.5 mol of dialdehyde per mol of bisimide are used, a polyimide of the formula:

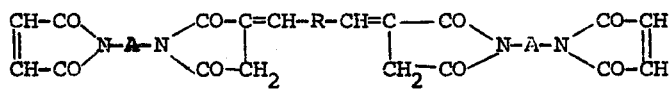

wherein the symbols A and R are as defined above is obtained when the bis-imide is a bis-maleimide. If now, the number of mols of tertiary phosphine is greater than 1 and less than 2, per mol of bis-imide, polyimides terminated by imido groups are obtained when the quantity of aldehyde is at least equal to 0.5 mol of dialdehyde per mol of phosphine. Finally, in order to produce polyimides with terminal aldehyde groups, at least 2 mols of tertiary phosphine per mol of bis-imide are used, and simultaneously, more than 0.5 mol of dialdehyde per mol of tertiary phosphine.

The reaction is generally carried out in a polar organic solvent such as N-methylpyrrolidone, dimethylformamide, dimethylacetamide, dimethylsulphoxide, phenol, cresol, N-methylcaprolactam, diethylformamide and N-acetylcaprolactam. Cresol is preferably used.

In practice, the polymers of this invention are prepared by dissolving two of the reagents in the chosen solvent and then introducing the third into the solution obtained.

According to a particular embodiment, it is possible, in a first stage, to prepare an addition product possessing groups of formula:

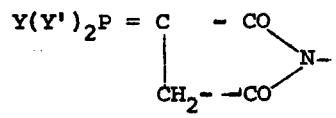

from the tertiary phosphine and the bis-imide (II) in a diluent such as acetic acid, benzene or one of the solvents mentioned above. In a second stage, after the addition product has been isolated, it is reacted with the dialdehyde under the conditions given above for the preparation of the polymers.

Whatever method is adopted, the oxide of the tertiary phosphine employed is formed in addition to the polyimide. The polyimide can be isolated from the final mixture by treatment with a solvent for the phosphine oxide in which the polyimide is insoluble or practically insoluble. Amongst the solvents which can be used, there may be mentioned in particular aromatic hydrocarbons such as benzene, toluene and xylene, organic acids such as acetic and butyric acid, ether, chloroform, acetone, methyl ethyl ketone and lower aliphatic alcohols such as methanol, ethanol and pentanol.

The polyimides according to the invention are soluble in cresol, and less soluble or insoluble in the other polar solvents. In the form of solutions, they can be used for coating metal surfaces or woven or non-woven fibrous materials. The products of high molecular weight, the inherent viscosity of which can be greater than 200 cm³/g, are very suitable for the manufacture of yarns, films and moulded objects.

The polyimides with terminal maleimidol or isomaleimidol groups are very suitable for the production of moulded objects, where appropriate by compression. They can be cured by heating at temperatures of the order of 150° to 350°C, optionally whilst they are being shaped.

The polyimides according to the present invention are of especial value in the fields of industry which require materials possessing good mechanical and electrical properties, an excellent impact strength and great chemical inertness at temperatures of 200° to 300°C.

The following Examples, further illustrate the present invention. In these Examples, the properties of the products were determined according to the following standard specifications:

flexural tests: ASTM Standard Specification D 790-63, tensile strength tests: ASTM Standard Specification D 882-61 T and impact strength tests: DYNSTAT Pendulum; 7 mm distance between the point where the test piece is fixed and the point of impact.

The viscosity of the polymers was determined at 25°C using 0.5% strength solutions in o-cresol.

EXAMPLE 1 a. 54.58 g of N,N'-4,4'-diphenylmethane-bis-maleimide and 20.89 g of terephthalaldehyde are dissolved in 425 g of cresol and 80.1 g of triphenylphosphine are added to the solution thus obtained. The temperature of the reaction mixture rises from 21° to 60°C. The mixture is cooled to 25°C and is then kept under these conditions for 1½ hours. The viscous solution (reaction mixture) is then run into 2 litres of methanol. A precipitate is obtained which is filtered off and then washed continuously with boiling methanol for 15 hours.

The precipitate is then dried at 40°C/30 mm Hg to constant weight.

68.6 g of a light yellow polymer consisting of a plurality of recurring units:

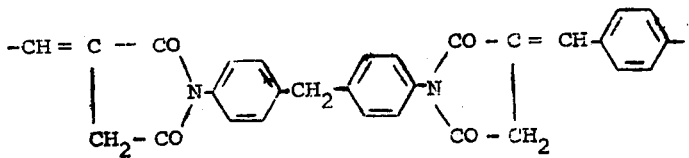

are obtained.

It is a film-forming polymer which softens at about 250°–270°C and which is soluble in concentrated sulphuric acid, cresol and o-chlorophenol and partially soluble in N-methylpyrrolidone. Its inherent viscosity, measured at 25°C, is 176 cm³/g.

Thermogravimetric analysis of the polymer, in powder form, under nitrogen (rate at which the temperature is raised: 5°C/minute) shows that there is no loss in weight up to 430°C.

The polymer thus produced is used in the preparation of films, moulded objects, laminates and yarns.

b. Preparation of a film.

A solution of 4 g of polymer in 40 g of cresol is degassed at 30 mm Hg, cast on a glass plate and dried for 2 hours at 150°C.

The film obtained is detached from the glass plate and heated for 3 hours at 250°C. A flexible transparent film, with a uniform thickness of 4 × 10⁻² mm, is finally obtained.

This film has a tensile breaking strength of 1,300 kg/cm² and an elongation of 7% at 25°C. At 250°C its tensile breaking strength is still 350 kg/cm² for an elongation of 25%.

c. Preparation of a moulded object.

10.1 g of the polymer are placed in a cylindrical mould of diameter 7.6 cm. The mould is heated to 300°C between the platens of a preheated press and a pressure of 25 bars is applied.

The whole is maintained (under these conditions) for 1 hour and then the object is released from the mould and subjected to a supplementary heat treatment for 48 hours at 250°C.

Several samples are subjected to a heat exposure at 300°C, and the characteristics which they possess as a function of the duration of the exposure are measured.

The results are given in Table (1).

TABLE (1)

| Duration (hours) | Loss in weight (5) | Temperature of the measurement (°C) | Flexural test Modulus (kg/mm²) | Tensile strength (kg/mm²) | Impact strength (kg.cm/cm³) |
|---|---|---|---|---|---|
| 0 | 0 | 25 | 280 | 11.5 | 55 |
|  |  | 250 | 180 | 7 |  |
| 120 | 2.9 | 25 |  |  | 33 |
|  |  | 250 | 400 | 2.8 |  |
| 265 | 5.2 | 25 | 288 | 5.9 | 18 |
|  |  | 250 | 370 | 2.0 |  | d. Preparation of a laminate.

A solution of 3.45 g of polymer in 45 g of cresol is used to coat a sample of glass fabric (11 × 18 cm) of the satin type, weighing 320 g/m²; in a first stage, each face of the fabric is coated with the said solution and is then dried at 120°C for 15 minutes under a stream of air, and the coatings are repeated until the entire solution is exhausted. The last coating is completed by 30 minutes of drying at 120°C.

18 strips of 5.5 × 4.5 cm are cut out of this pre-impregnated fabric. These strips are stacked and wrapped up in aluminum foil, and the combination is introduced between the platens of a press preheated to 300°C. A pressure of 55 bars is applied to the platens and the whole is then maintained (under these conditions) for 1 hour. After release from the mould, a light yellow laminate is obtained which has a flexural breaking strength of 31 kg/mm² and a flexural modulus of 1,400 kg/mm² at 25°C.

e. Preparation of a yarn.

A 10% strength by weight solution of polymer in cresol is wet spun (coagulating bath: acetone) with a spinneret containing 13 holes of diameter 15 × 10⁻²mm. After the filament obtained has been dried, it is stretched in a ratio of 1.55 at 320°C.

A multifilament yarn of gauge 316 dtex and tensile breaking strength 0.57 g/dtex for an elongation of 5% is obtained. The secant breaking modulus is 12 g/dtex and Young' modulus is 16 g/dtex.

EXAMPLE 2

3.58 g of N,N'-4,4'-diphenylmethane-bis-isomaleimide and 1.36 g of terephthalaldehyde are dissolved in 50 cm³ of cresol. 5.44 g of triphenyl-phosphine are added to the solution obtained and the whole is left to stand overnight.

The polymer solution obtained is run into methanol. A precipitate is obtained which is filtered off, washed with methanol and dried at 50°C/30 mm Hg to constant weight. 4.4 g of polymer, consisting of a plurality of recurring units of the formula:

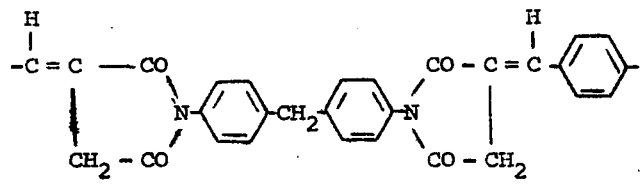

are thus isolated in the form of a light yellow powder. Its inherent viscosity is 120 cm³/g.

EXAMPLE 3

7.16 g of N,N'-4,4'-diphenylmethane-bis-maleimide are dissolved in 90 cm³ of cresol and then .11 g of triphenyl-phosphine are added.

After 15 minutes, 2.28 g of adipaldehyde are introduced and then the whole is stirred for 16 hours. The viscous solution is poured into 400 cm³ of methanol. The polymer which has precipitated is washed with methanol and then dried at 50°C/30 mm Hg.

8.8 g of a pink powder, which is soluble in cresol and partially soluble in dimethylformamide and which consists of a polymer comprising a plurality of recurring units:

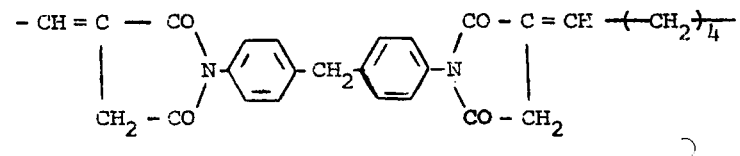

are thus obtained.

The inherent viscosity of this polymer is 152 cm³/g. Its softening point is about 270°C. Thermogravimetric analysis of this powder, under nitrogen (rate at which the temperature is raised: 5°C/minute) reveals a loss in weight of 5% at a temperature of 430°C.

A light brown, transparent and flexible film, of thickness 4.3 × 10⁻²mm, is produced with a solution of this polymer. The film has a tensile breaking strength of 910 kg/cm² for an elongation of 5% at 25°C.

EXAMPLE 4

3.58 g of N,N'-4,4'-diphenylmethane-bis-maleimide and 0.56 g of 5,5'-methylene-bis-salicylaldehyde are dissolved in 45 cm³ of dimethylformamide and then 5.4 g of triphenyl-phosphine are added. The solution is stirred for 16 hours. The viscous solution obtained is poured into methanol. After washing the precipitate with methanol and drying it at 50°C/30 mm Hg, 5.6 g of polymer, consisting of a plurality of recurring units of the formula:

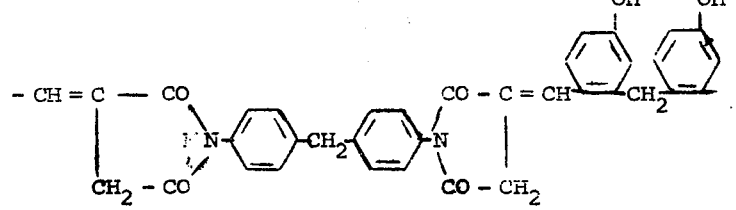

are obtained.

This polymer is in the form of a pink powder which is soluble in cresol and has an inherent viscosity of 92 cm³/g. Thermogravimetric analysis of this powder, under nitrogen (rate at which the temperature is raised: 5°C/minute) shows a loss in weight of 5% at 400°C.

A transparent red-orange film of thickness 3.2 × 10⁻² mm, is produced from a solution of this polymer in cresol. The tensile breaking strength of the film is 740 kg/cm² for an elongation of 2.3%.

EXAMPLE 5

The experiment described in Example 2 is repeated, but using 3.82 g of N,N'-4,4'-(diphenyl ether)-bis-maleimide, 1.35 g of terephthalaldehyde and 5.4 g of triphenyl-phosphine. 5g of polymer with the recurring unit:

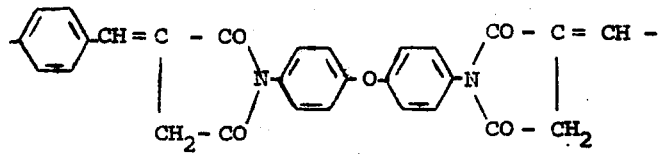

are isolated.

Its inherent viscosity is 104 cm³/g.

Following the procedure of Example 1b, a film of thickness $2 \times 10^{-2}$ mm is produced. Its tensile breaking strength is 915 kg/cm² for an elongation of 5.5%.

EXAMPLE 6

The experiment described in Example 2 is repeated, but using 3.58 g of N,N'-4,4'-diphenylmethane-bis-maleimide, 3.32 g of diethylphenyl-phosphine and 1.35 g of terephthalaldehyde. 4.5 g of polymer are isolated, the recurring unit of which is the same as that of the polymer described in Example 1, and the inherent viscosity of which is 106 cm³/g.

EXAMPLE 7

Following the procedure described in Example 6, but replacing the diethylphenyl-phosphine by 4.04 g of tri-butyl phosphine, 4.84 g of a polymer are obtained, the recurring unit of which is the same as that of the polymer described in Example 1. Its inherent viscosity is 106 cm³/g. A film of thickness $3 \times 10^{-2}$ mm was produced in accordance with the procedure of Example 1b. Its tensile breaking strength is 520 kg/cm² for an elongation of 2.8%.

I claim:

1. A linear polyimide which consists essentially of a product of the general formula:

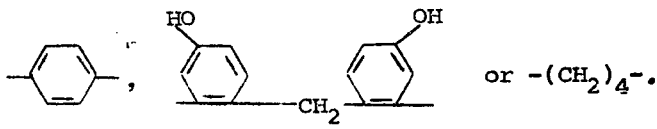

in which:
A represents a divalent organic radical with 2 to 30 carbon atoms,
R represents a simple valency bond or a divalent organic radical with 1 to 24 carbon atoms,
$a$ represents a number at least equal to 1 and
T and T', which may be identical or different, each represents a radical selected from a radical of the formula:

 (T₁)

in which Y represents a hydrogen radical with 4 to 12 carbon atoms, and each of the symbols Y', which may be identical or different, represents a hydrocarbon radical with 1 to 12 carbon atoms or Y and Y' together form a divalent hydrocarbon radical with 2 to 12 carbon atoms; a maleimido radical of the formula:

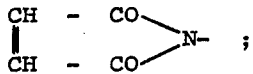 ;

an isomaleimido radical of the formula:

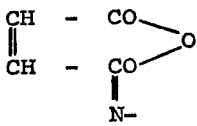

and a radical of the formula:

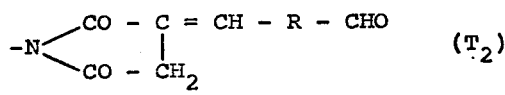 (T₂)

in which R is as defined above.

2. A polyimide according to claim 1 in which A represents a phenylene radical or several phenylene radicals bonded to one another by a simple valency bond or by an inert atom or group.

3. A polyimide according to claim 1 in which R represents a radical of the formula:

 or $-(CH_2)_4-$.

4. A process for the preparation of a polyimide as defined in claim 1 which comprises reacting a bisimide of the general formula:

$$Z - A - Z$$

in which Z represents a maleimido or isomaleimido radical, with a tertiary phosphine of the general formula:

$$PY(Y')_2$$

in which Y and Y' are as defined in claim 1 and with a dialdehyde of the general formula:

$$OHC - R - CHO$$

in which R is as defined in claim 1.

5. Process according to claim 4 in which the reaction is carried out in a polar organic solvent.

6. Process according to claim 4 in which about 1 to 5 mols of tertiary phosphine and at least about 0.5 mol of dialdehyde are used per mol of bis-imide.

7. Process according to claim 6 in which about 2 mols of tertiary phosphine and about 0.5 mol of dialdehyde are used per mol of bis-imide.

8. Process according to claim 6 in which about 1 mol of tertiary phosphine and about 0.5 mol of dialdehyde are used per mol of bis-imide.

9. Process according to claim 4 which comprises first reacting the tertiary phosphine and the bis-imide to give an addition product possessing groups of the formula:

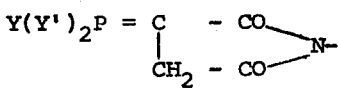

and then reacting the addition product with the dialdehyde.

10. A moulded article obtained by curing a linear polyimide as defined in claim 1.

11. A polyimide as defined in claim 1 in the form of a film or filament.

12. A polyimide according to claim 1 in which A represents an alkylene radical having less than 13 carbon atoms, a phenylene radical, a cyclohexylene radical, one of the radicals of the formulae:

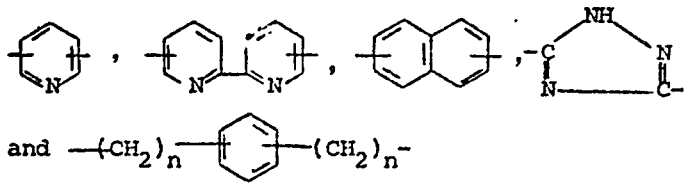

wherein $n$ represents an integer from 1 to 3, a divalent radical with 12 to 30 carbon atoms, consisting of phenylene or cyclohexylene radicals bonded to one another by a simple valency bond or by an inert atom or group selected from —O—, —S—, an alkylene group with 1 to 3 carbon atoms, —CO—, —SO$_2$—, —NR$_1$—, —N=N—, —CONH—, —COO—, —P(O)R$_1$—, —CONH—X—NHCO—,

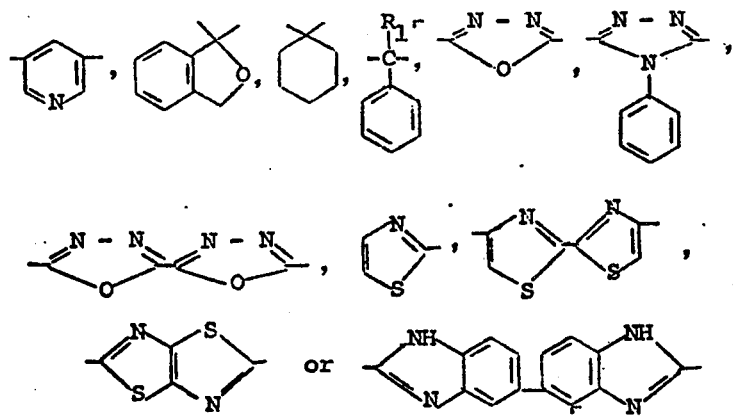

wherein R$_1$ represents a hydrogen atom, an alkyl radical with 1 to 4 carbon atoms, a phenyl radical or a cyclohexyl radical and X represents an alkylene radical with less than 13 carbon atoms, said phenylene and cyclohexylene radicals optionally being substituted by methyl groups, each of Y and Y' represents a linear or branched alkyl group with 1 to 12 carbon atoms, a phenylalkyl group with 7 to 11 carbon atoms, a cycloalkyl or cycloalkenyl group with 5 to 8 carbon atoms, a phenyl group, an alkylphenyl group with 7 to 11 carbon atoms or a naphthyl group, said phenyl and naphthyl radicals optionally being substituted by fluorine, chlorine or bromine atoms or by alkoxy groups with 1 to 4 carbon atoms; or an alkylene radical with 1 to 12 carbon atoms, an alkylene radical with 2 to 12 carbon atoms, an alkinylene radical with 4 to 12 carbon atoms, a cycloalkylene or cycloalkenylene radical with 5 to 12 carbon atoms, a pyridinediyl radical, a phenylene radical, a diphenylene radical, a terphenylene radical, a naphthylene radical or a divalent radical possessing several benzene rings bonded to one another by an inert atom or group selected from —O—, —S—, —NH—, —N(CH$_3$)—, —CH$_2$—, —C(CH$_3$)$_2$—, —SO$_2$—, —C(O)O—, —CONH—, —N=N—, and —N=N( → O)—, said radicals optionally being substituted by a fluorine, chlorine or bromine atom or a nitro, methyl, methoxy or phenolic hydroxyl group.

* * * * *